United States Patent [19]
von der Crone et al.

[11] Patent Number: 4,865,650
[45] Date of Patent: Sep. 12, 1989

[54] NOVEL COMPOSITIONS BASED ON TETRACHLOROISOINDOLINONE PIGMENTS

[75] Inventors: Jost von der Crone, Arconciel; Bernhard Medinger, Giffers; Philippe Bugnon, Essert, all of Switzerland

[73] Assignee: Ciba-Geigy Corporation, Ardsley, N.Y.

[21] Appl. No.: 133,677

[22] Filed: Dec. 16, 1987

[30] Foreign Application Priority Data

Dec. 17, 1986 [CH] Switzerland .................. 5054/86

[51] Int. Cl.$^4$ ............... C09B 57/04; C07D 209/44
[52] U.S. Cl. ............................. 106/494; 106/498; 544/144; 544/373; 544/410; 546/151; 546/182; 546/208; 546/347; 548/300; 548/460; 548/471
[58] Field of Search ............... 106/288 Q, 494, 498, 106/493; 548/460, 471, 300; 544/373, 410, 144; 546/182, 208, 347, 151

[56] References Cited

U.S. PATENT DOCUMENTS

| | | | |
|---|---|---|---|
| 3,076,815 | 2/1963 | Pugin | 260/325 |
| 3,758,497 | 9/1973 | Pugin et al. | 260/325 |
| 4,272,298 | 6/1981 | Babler | 106/288 Q |
| 4,371,467 | 2/1983 | Ando et al. | 106/288 Q |
| 4,764,217 | 8/1988 | von der Crone et al. | 106/494 |

*Primary Examiner*—Paul Lieberman
*Assistant Examiner*—Christine A. Skane
*Attorney, Agent, or Firm*—Luther A. R. Hall; Bruce M. Collins

[57] ABSTRACT

Composition of matter containing:
(a) a compound of the formula I

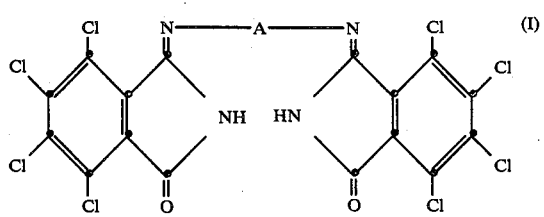

in which A is one of the groups of the formulae

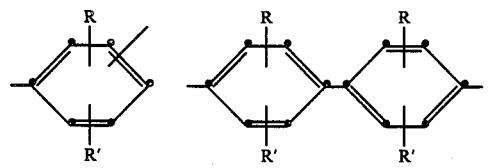

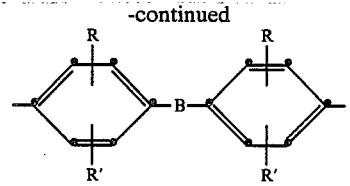

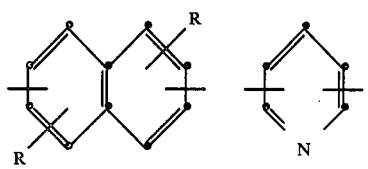

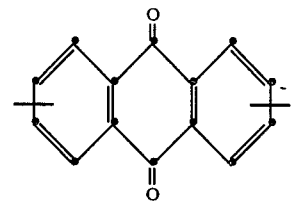

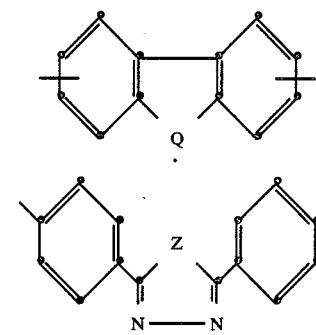

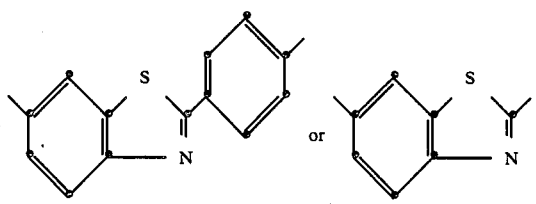

in which B is —O—, —S—, —SO$_2$—, —N=N—, —CH$_2$—, —CH=CH—, —O—CH$_2$—O—

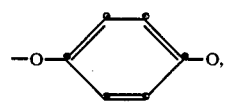

—CONH—, —NHCONH— or —CONHNHCO—, Q is —O' or —NH' and Z is —O— or —S— and R and R' are independently of each other hydrogen, halogen, C$_1$-C$_4$-alkyl, C$_1$-C$_4$-alkoxy or phenoxy, and
(b) a compound of the formula II (Abstract continued on next page.)

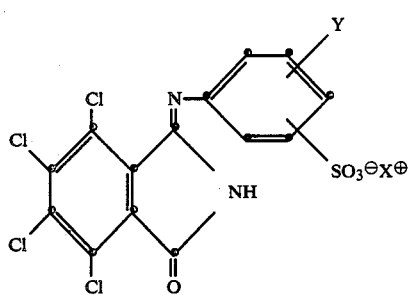

(II)

in which $X^\oplus$ is $H^\oplus$ or a group of the formulae $$\frac{M^{n\oplus}}{n}$$

or $N^\oplus(R_1)(R_2)(R_3)(R_4)$, $M^{n\oplus}$ is an n-valent metal cation, n is 1, 2 or 3, $R_1$, $R_2$, $R_3$ and $R_4$ are independently of one another hydrogen, $C_1$–$C_{18}$-alkyl, $C_5$–$C_6$-cycloalkyl, unsubstituted or $C_1$–$C_{18}$-alkyl-substituted phenyl or $R_3$ and $R_4$ together with the N atom form a pyrrolidine, imidazolidine, piperidine, piperazine or morpholine radical, or $R_2$, $R_3$ and $R_4$ together with the N atom form a pyrrole, pyridine, picoline, pyrazine, quinoline or isoquinoline radical and Y is hydrogen, halogen, methyl or amino.

Pigment mixtures of this type, in particular when used in paints, are distinguished in particular by increased tinctorial strength and high luster and especially by improved rheology.

15 Claims, No Drawings

NOVEL COMPOSITIONS BASED ON TETRACHLOROISOINDOLINONE PIGMENTS

The invention relates to compositions containing a bis-(tetrachloroisoindolinone) pigment and a sulfonated mono-(tetrachloroisoindolinone) compound and to the use thereof for colouring high molecular weight organic material.

Tetrachloroisoindolinone pigments, which have long been used for colouring high molecular weight organic material (cf. for example DE Auslegeschrift 1,098,126 and DE Offenlegungsschrift 1,914,271), do not always meet the requirements of modern industry, in particular in respect of their rheological properties.

It has now been found that by adding certain sulfonated mono(tetrachloroisoindolinone) compounds to bis(tetrachloroisoindolinone) pigments the rheological behaviour of the latter is surprisingly improved.

The present invention accordingly provides a composition containing (a) an isoindolinone pigment of the formula I

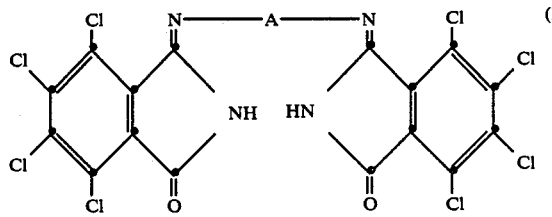

in which A is one of the groups of the formulae

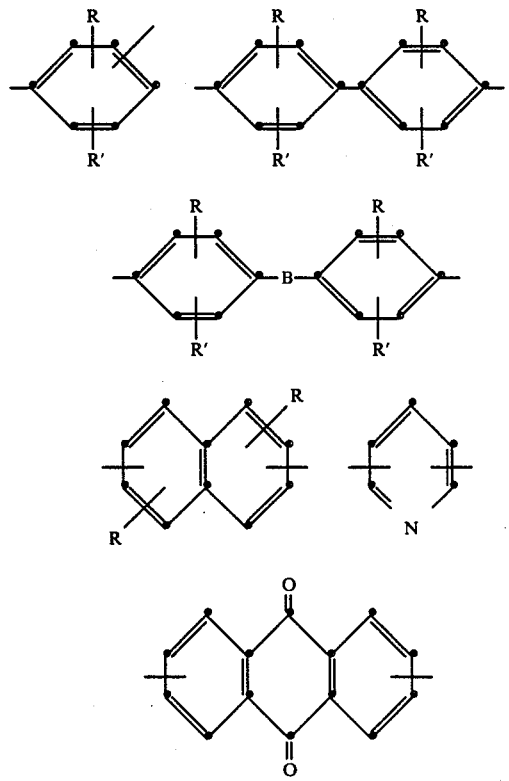

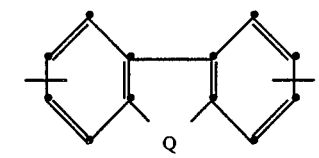

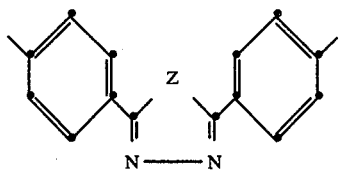

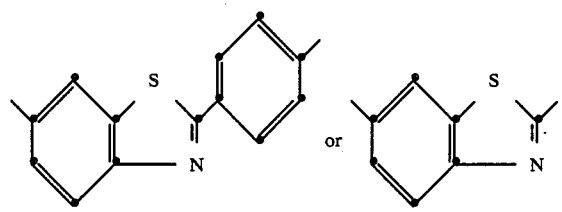

in which B is —O—, —S—, —SO$_2$—, —N=N—, —CH$_2$—, —CH=CH—, —O—CH$_2$—O—

—CONH—, —NHCONH—, or —CONHNH-CO—, Q is —O— or —NH— and Z is —O— or —S— and R and R' are independently of each other hydrogen, halogen, C$_1$-C$_4$-alkyl, C$_1$-C$_4$-alkoxy or phenoxy, and (b) a compound of the formula II

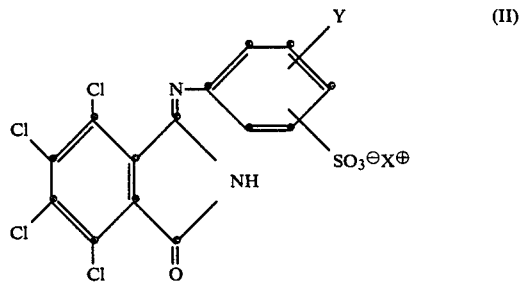

in which X$^\oplus$ is H$^\oplus$ or a group of the formulae

$$\frac{M^{n\oplus}}{n}$$

or N$^\oplus$(R$_1$) (R$_2$) (R$_3$) (R$_4$), M$^{n\oplus}$ is an n-valent metal cation, n is 1, 2 or 3, R$_1$, R$_2$, R$_3$ and R$_4$ are independently of one another hydrogen, C$_1$-C$_{18}$-alkyl, C$_5$-C$_6$-cycloalkyl, unsubstituted or C$_1$-C$_{18}$-alkyl-substituted phenyl or R$_3$ and R$_4$ together with the N atom form a pyrrolidine, imidazolidine, piperidine, piperazine or morpholine radical, or R$_2$, R$_3$ and R$_4$ together with the N atom form a pyrrole, pyridine, picoline, pyrazine, quinoline or isoquinoline radical and Y is hydrogen, halogen, methyl or amino.

A halogen substituent is for example fluorine, preferably bromine and in particular chlorine.

A $C_1$–$C_4$-alkyl R or R' is for example, methyl, ethyl, n-propyl, isopropyl, n-butyl, sec.-butyl or tert.-butyl. Methyl is preferred.

A $C_1$–$C_4$-alkoxy R or R' is for example methoxy, ethoxy, n-propoxy, n-butoxy or sec-butoxy. Methoxy is preferred.

A is preferably a phenylene group of the formula

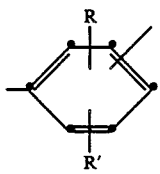

In this meaning A is for example an unsubstituted p- or m-phenylene group or a 2-chloro-1,4-phenylene, 2-methyl-1,4-phenylene, 2-ethyl-1,4-phenylene, 2-n-propyl-1,4-phenylene, 2-isopropyl-1,4-phenylene, 2-tert.-butyl-1,4-phenylene, 2-methoxy-1,4-phenylene, 2-ethoxy-1,4-phenylene, 2-tert.-butoxy-1,4-phenylene, 2,5-dichloro-1,4-phenylene, 2,5-dimethyl-1,4-phenylene, 2,5-diethyl-1,4-phenylene, 2,5-dimethoxy-1,4-phenylene, 2,5-diethoxy-1,4-phenylene, 2-chloro-5-methyl-1,4-phenylene, 2-chloro-5-methoxy-1,4-phenylene, 2-methyl-5-methoxy-1,4-phenylene, 2,6-dichloro-1,4-phenylene, 2,6-dimethyl-1,4-phenylene, 2-chloro-6-methoxy-1,4-phenylene, 2-chloro-1,3-phenylene, 2-methyl-1,3-phenylene, 2-methoxy-1,3-phenylene, 2,5-dichloro-1,3-phenylene, 2,5-dimethyl-1,3-phenylene or 2-chloro-5-methyl-1,3-phenylene group, but in particular a 1,4-phenylene group which is monosubstituted by chlorine, methyl, methoxy or ethoxy in the 2-position or disubstituted identically or differently in the 2,5-position by chlorine, methyl, methoxy or ethoxy. The unsubstituted p-phenylene group is preferred.

A group A of the formula

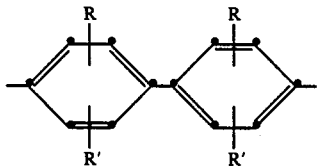

is for example an unsubstituted 4,4'-biphenylylene group or a 3,3'-dichloro-, 3,3'-dimethyl-, 3,3'-diethyl-, 3,3'-diisopropyl-, 3,3'-di-n-butyl-, 3,3'-di-tert.-butyl-, 3,3'-dimethoxy-, 3,3'-diethoxy-, 3,3'-di-tert.-butoxy-, 3,3',5,5'-tetrachloro-, 3,3',5,5'-tetramethyl-, 3,3',5,5'-tetramethoxy-, 3,3'-dichloro-5,5'-dimethyl-, 3,3'-dichloro-5,5'-dimethoxy-, 3,3'-dimethyl-5,5'-methoxy-4,4'-biphenylylene group, but in particular a 4,4'-biphenylylene group identically disubstituted in the 3,3'-position by chlorine, methyl, methoxy or ethoxy.

A group A of the formula

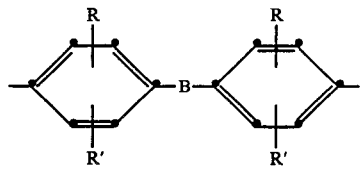

is for example a p,p'-diphenylylene ether, p,p'-diphenylylene sulfide, p,p'-diphenylylene sulfone, p,p'-diphenylyleneazo, diphenylylene methane, p,p'-diphenylylene ethene, p,p'-diphenylylene dioxymethane, p,p'-diphenylylene dioxybenzene, p,p'-diphenylylene carbamide, p,p'-diphenylylene urea or p,p'-diphenylylene dicarbamyl hydrazine group which can each be substituted in the same way as the abovementioned biphenylylene derivatives, but are preferably unsubstituted.

A further is for example 1,4-, 1,5- or 2,6-naphthylene, 1,5-anthraquinonediyl, 1,4-anthraquinonediyl, 2,6-pyridinediyl, 2,7-carbazolediyl, 2,8-dibenzofurandiyl, 3,8-dibenzofurandiyl, 3,7-dibenzofurandiyl, 6,4'-(2-phenyl)-benzothiazolediyl, 2,6-benzothiazolediyl, 4',4''-(2,5-bisphenyl)-oxadiazolediyl or 4',4''-(2,5-bisphenyl)-thiadiazolediyl which can each be substituted in the same way as the abovementioned biphenylylene derivatives, but are preferably unsubstituted.

$X^\oplus$ is preferably $H^\oplus$ or in particular a group of the formula

In a group $X^\oplus$ of the formula

$M^{n\oplus}$ is for example an alkali metal, alkaline earth metal, aluminium or transition metal cation, for example $Na^\oplus$, $K^\oplus$, $Mg^{2\oplus}$, $Ca^{2\oplus}$, $Sr^{2\oplus}$, $Ba^{2\oplus}$, $Mn^{2\oplus}$, $Cu^{2\oplus}$, $Ni^{2\oplus}$, $Cd^{2\oplus}$, $Co^{3\oplus}$, $Al^{3\oplus}$ and $Cr^{3\oplus}$ but in particular an alkali metal or alkaline earth metal cation (n=1 or 2) and preferably $Ca^{2\oplus}$.

A $C_1$–$C_{18}$-alkyl substituent is for example methyl, ethyl, n-propyl, isopropyl, n-butyl, sec.-butyl, tert.-butyl, n-pentyl, tert.-pentyl, hexyl, heptyl, octyl, decyl, dodecyl, tetradecyl, hexadecyl, heptadecyl or octadecyl.

A $C_5$–$C_6$-cycloalkyl $R_1$, $R_2$, $R_3$ or $R_4$ is for example cyclopentyl or in particular cyclohexyl.

A $C_1$–$C_{18}$-alkyl-substituted phenyl $R_1$, $R_2$, $R_3$ or $R_4$ is preferably $C_{12}$–$C_{18}$-alkyl-substituted phenyl.

Specific examples of $N^\oplus(R_1)(R_2)(R_3)(R_4)$ are: $N^\oplus H_4$, $N^\oplus H_3CH_3$, $N^\oplus H_2(CH_3)_2$, $N^\oplus H_3C_2H_5$, $N^\oplus H_2(C_2H_5)_2$, $N^\oplus H_3C_3H_7$-iso, $N^\oplus H_3$-cyclohexyl, $N^\oplus H_2$-(cyclohexyl)$_2$, $N^\oplus H_2(CH_3)(C_6H_5)$, $N^\oplus H_3C_6H_5$ $N^\oplus H_3$-octadecylphenyl and $N^\oplus(CH_3)_4$.

The tetrachloroisoindolinone pigments of the formula I are known and can be prepared by known methods.

The compounds of the formula II are novel and comprise a further part of the subject-matter of the invention. They are obtained analogously to processes known per se, for example by condensation of lower alkyl, preferably methyl, 3,4,5,6-tetrachloro-2-cyanobenzoate with an amine of the formula

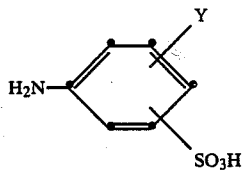

in which Y is defined above, in a molar ratio of 1:1, in the absence of water, in a polar organic solvent, preferably methanol, ethanol, or isopropanol, and in the presence of a base, for example sodium methylate or sodium ethylate, and if desired by subsequent reaction with a salt $X^{\oplus}L^{\ominus}$ in which $X^{\oplus}$ is one of the groups $$\frac{M^{n\oplus}}{n}$$

or $N^{\oplus}(R_1)(R_2)(R_3)(R_4)$ as defined above and $L^{\ominus}$ is for example a hydroxyl, chloride, acetate or nitrate ion.

To prepare the composition according to the invention, advantageously component (a) is first conditioned in a conventional manner and suspended in water. Component (b) is in general added in the form of a free sulfonic acid, and the salt $X^{\oplus}L^{\ominus}$ is added to obtain precipitation. It is also possible to mix component (b) directly in salt form in aqueous suspension with component (a).

The mixing ratios of the components of the compositions according to the invention can vary within wide limits. Preferred mixing ratios, however, range from 1 to 10% by weight of component (b): 99 to 90% by weight of component (a), but in particular from 2 to 8% by weight of component (b): 98 to 92% by weight of component (a) and preferably from 4 to 6% by weight of component (b): 96 to 94% by weight of component (a).

The addition of component (b) preferably takes place, as mentioned above, after the conditioning of component (a). Conditioning is to be understood as meaning the preparation of a fine particle form, for example by alkaline precipitation, dry milling with or without salt, solvent or aqueous milling and salt kneading.

Depending on the conditioning method or intended application, it can be of advantage to add to the pigment not only the amount of component (b) required according to the invention but also certain amounts of texture-improving agents before or after the conditioning process. These comprise in particular fatty acids having at least 18 C atoms, for example stearic or behenic acid or their amides or metal salts, in particular Mg salts, and also plasticizers, waxes, resin acids, such as abietic acid, rosin soap, alkylphenols or aliphatic alcohols, such as stearyl alcohol or vicinal diols, such as dodecane-1,2-diol, and also modified rosin maleate resins or fumaric acid rosin resins. The texture-improving agents are preferably added in amounts of 0.1–30% by weight, in particular 2–15% by weight, based on the end product.

The compositions according to the invention are suitable for use as pigments for colouring high molecular weight organic material.

High molecular weight organic materials which can be coloured or pigmented with the compositions according to the invention are for example cellulose ethers and esters, such as ethylcellulose, nitrocellulose, cellulose acetate or cellulose butyrate, natural resins or synthetic resins, such as polymerization resins or condensation resins, such as amino resins, in particular urea- and melamine-formaldehyde resins, alkyd resins, phenolic resins, polycarbonates, polyolefins, polystyrene, polyvinyl chloride, polyamides, polyurethanes, polyesters, rubber, casein, silicone and silicone resins, individually or mixed.

High molecular weight organic materials in dissolved form for use as film formers also come into consideration, for example linseed oil varnish, nitrocellulose, alkyd resins, phenolic resins, melamine resins, acrylic resins and urea-formaldehyde resins.

The high molecular weight organic compounds mentioned can be present individually or mixed as plastic compositions, melts or in the form of spinnable solutions, surface coatings, paints or printing inks. Depending on the intended use, it has proven advantageous to use the compositions according to the invention as toners or in the form of formulations. Based on the high molecular weight organic material to be pigmented, the compositions according to the invention can be used in an amount of 0.01 to 30% by weight, preferably 0.1 to 10% by weight.

The pigmenting of the high molecular weight organic substances with the compositions according to the invention is effected for example by mixing such a composition, if desired in the form of a master-batch, into these substrates using roll mills or mixing or milling apparatus. The pigmented material is then brought into the desired final form by methods known per se, such as calendering, pressing, extruding, coating, casting or injection moulding. Frequently it is desirable, if the mouldings to be produced are not to be rigid or to reduce their brittleness, to incorporate plasticizers in the high molecular weight compounds before moulding. These plasticizers can be for example esters of phosphoric acid, phthalic acid or sebacic acid. Plasticizers can be incorporated into the polymers before or after incorporation of the compositions according to the invention. It is also possible, if different hues are to be obtained, to add to the high molecular weight organic materials not only the compositions according to the invention but also fillers and other colouring constituents, such as white, coloured or black pigments, in any desired amount.

For pigmenting of paints and printing inks, the high molecular weight organic materials and the compositions according to the invention, if desired together with additives, such as fillers, other pigments, siccatives or plasticizers, are finely dispersed or dissolved in a common organic solvent or a solvent mixture. This can be done by dispersing or dissolving the individual components by themselves or, alternatively, several of them together, and only then combining all the components.

The colorings obtained, for example in plastics, fibres, paints or prints, are distinguished by good general properties, such as good dispersibility, high transparency, good over-lacquering, migration, heat, light and weather resistance, and the colored plastics exhibit absence of distortion. In addition, the compositions according to the invention, compared with unmodified tetrachloroisoindolinone pigments, have in particular in paints and printing inks improved rheology, lower separation effects, such as floating in the presence of white pigments, and a lower flocculation tendency.

As a consequence of the good rheological properties of the pigment mixtures according to the invention it is possible to produce paints having high pigment loadings.

The compositions according to the invention are preferably suitable for coloring aqueous and/or solvent-containing paints, in particular automotive paints. Their use is very particularly preferred for metallic effect coatings.

The examples which follow serve to illustrate the invention.

EXAMPLE 1(a)

6.0 g of methyl 3,4,5,6-tetrachloro-2-cyanobenzoate are added to a solution of 40 ml of methanol and 1.08 g of sodium methylate. The mixture is stirred for half an hour. A solution of 3.46 g of metanilic acid, 1.08 g of sodium methylate and 30 ml of methanol is then added and stirred in at room temperature for 15 hours. This is followed, while stirring, by refluxing for 3 hours, acidifying with 2.5 ml of acetic acid and a further 2 hours under reflux. The reaction product is filtered off at room temperature, washed with a little methanol and dried to give 7.0 g of a yellow dye of the formula

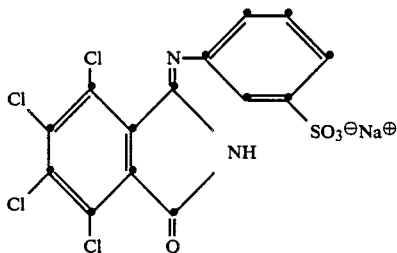

| Analysis for $C_{14}H_5Cl_4N_2O_4SNa$ | | | |
|---|---|---|---|
| C | H | N | S |
| calculated: 36.36% | 1.08% | 6.06% | 6.93% |
| found: 35.55% | 1.61% | 5.83% | 6.98% |

(b)

4.4 g of the yellow dye obtained as described under (a) are heated while stirring in 200 ml of water to 70° C. A solution of 8.74 g of $CaCl_2 \times 2H_2O$ in 50 ml of water are added and stirred in at 70° C. for 30 minutes. The yellow dye obtained is filtered off hot, washed with water and dried to give 3.5 g of the calcium salt of the formula

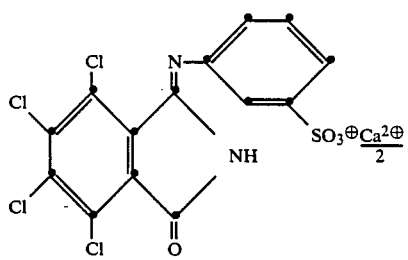

EXAMPLE 2

6.0 g of methyl 3,4,5,6-tetrachloro-2-cyanobenzoate are reacted with 1.08 g of sodium methylate in 40 ml of methanol as described in Example 1. To the solution obtained are added 1.9 g of 1,4-phenylenediamine-2-sulfonic acid, 0.54 g of sodium methylate and 30 ml of methanol. The result is an orange-brown solution which is stirred at room temperature for 3 hours. This is followed, while stirring, by refluxing for 3 hours, acidifying with 2.5 ml of acetic acid and a further 2 hours under reflux. The precipitated reaction product is filtered off hot, washed with a little methanol and dried to give 4.1 g of a yellow dye of the formula

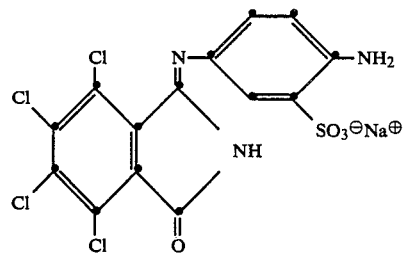

| Analysis for $C_{14}H_6Cl_4N_3O_4SNa$ | | | | |
|---|---|---|---|---|
| C | H | N | S | Cl |
| calculated: 35.25% | 1.27% | 8.81% | 6.72% | 29.72% |
| found: 35.07% | 1.99% | 8.33% | 6.2% | 28.5% |

EXAMPLE 3

6.0 g of methyl 3,4,5,6-tetrachloro-2-cyanobenzoate are reacted with 1.08 g of sodium methylate in 40 ml of methanol as described in Example 2. A suspension of 4.2 g of the sodium salt of 1,3-phenylenediamine-4-sulfonic acid in 60 ml of methanol is added and stirred in at room temperature for 16 hours, and the mixture is subsequently heated at the reflux temperature for 3 hours. The reaction mixture is acidified with 5 ml of glacial acetic acid and refluxed for a further 2 hours. The precipitate is filtered off hot, washed with a little methanol and dried to give 4.8 g of a greenish yellow dye of the formula

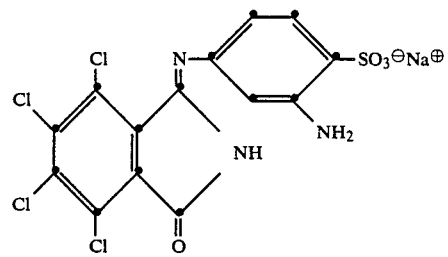

EXAMPLE 4

(a)

15 g of bis-[4,5,6,7-tetrachloroisoindolin-3-on-1-ylidene]phenylene-1,4-diamine are suspended at room temperature in 150 ml of dimethylformamide. 50 ml of a 1N methanolic sodium methylate solution are run with stirring into the yellow suspension, and the clear yellow solution of the sodium salt of the starting isoindoline forms. After one hour of stirring at room temperature 500 ml of water are added to the solution, the resulting precipitate is filtered off, and the filter cake is washed neutral with water.

(b)

17.4 g of the moist press cake obtained as described in (a) (35% solids content) are suspended in 100 ml of water. 0.3 g of the compound of Example 1(a) are then added, followed after half an hour of stirring at 70°-75° C. by 2.4 g of calcium chloride. After a further half hour the pigment mixture is filtered at 70° C. and dried to give 5.8 g of a yellow mixed pigment.

To determine the flow properties, the mixed pigment thus obtained is incorporated in a conventional manner into an alkyd paint system (®Setal 84, Kunstharzfabriek Synthesis B. V., Holland; solids content: 70% by weight).

The flow properties of the millbase, which contains 12% by weight of pigment and 54% by weight of total solids and whose pigment/binder ratio is 0.3, is determined using a HAAKE ®Rotovisco RV 12 viscometer (measuring temperature: 25° C., measuring system: SV-SP, shear range; D=0-100 [1/s]. The flow curves can simply be characterized by reporting viscosity values at D=10 [1/s] and 100 [1/s] determined from optimal regression curves.

The millbase with the pigment mixture of Example 4b gives the following viscosity values:
 at D=10 [1/s]: 708 mPa.s,
 at D=100 [1/s]: 134 mPa.s.

A millbase with the dried pigment of Example 4a without addition as per 4b, gives the following viscosity values:
 at D=10 [1/s]: 1370 mPa.s,
 at D=100 [1/s]: 297 mPa.s.

EXAMPLE 5

Example 4b is repeated, except that the compound of Example 1(a) is replaced by the compound of Example 2, affording a yellow mixed pigment having equally good rheological properties as that of Example 4b.

The millbase with this pigment mixture is found to have the following viscosity values:
 at D=10 [1/s]: 869 mPa.s,
 at D=100 [1/s]: 166 mPa.s.

EXAMPLE 6

10 g of the tetrachloroisoindolinone pigment C.I. Pigment Yellow 110, which has a specific surface area of 22 m²/g (determined by the BET method; J. Am. Chem. Soc. 60, 309, 1938), are suspended in 200 ml of water. To this suspension is added 0.5 g of the compound of Example 1(a), and stirred in for 30 minutes, followed by a solution of 0.66 g of CaCl₂×2H₂O in 10 ml of water. After a further 30 minutes of stirring the pigment mixture is filtered and dried to give 10.6 g of yellow mixed pigment.

The millbase with this pigment mixture is found to have the following viscosity values:
 at D=10 [1/s]: 265 mPa.s,
 at D=100 [1/s]: 71 mPa.s.

A millbase with this untreated pigment is found to have the following viscosity values:
 at D=10 [1/s]: 593 mPa.s,
 at D=100 [1/s]: 122 mPa.s.

EXAMPLE 7

Example 6 is repeated, except that C.I. Pigment Yellow 110 is replaced by the same amount of the tetrachloroisoindolinone pigment C.I. Pigment Yellow 109, affording 10.2 g of a greenish yellow pigment mixture.

The milled paint mix with this pigment mixture is found to have the following viscosity values:
 at D=10 [1/s]: 158 mPa.s,
 at D=100 [1/s]: 52 mPa.s.

A milled paint mix with the untreated pigment is found to have the following viscosity values:
 at D=10 [1/s]: 313 mPa.s,
 at D=100 [1/s]: 82 mPa.s.

What is claimed is:

1. A composition containing
 (a) an isoindolinone pigment of the formula I

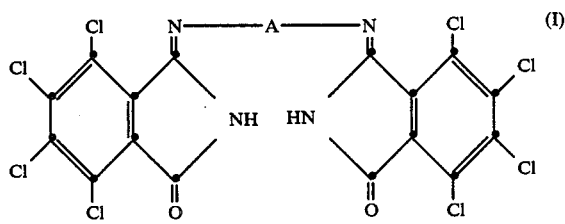

in which A is one of the groups of the formulae

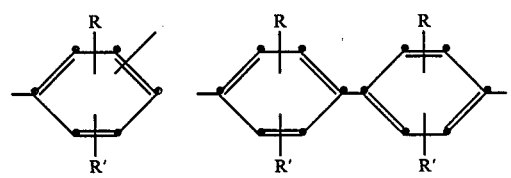

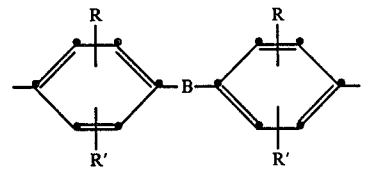

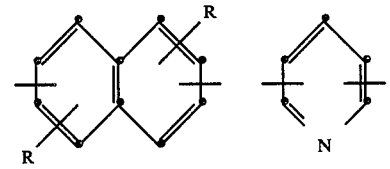

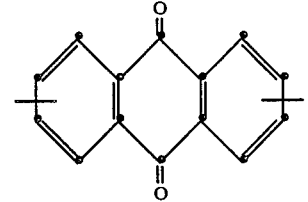

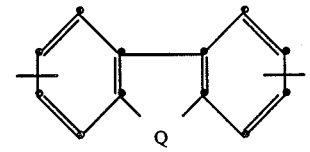

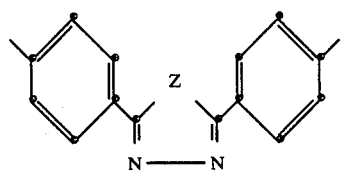

-continued

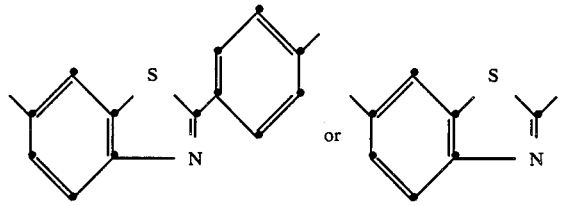

in which B is —O—, —S—, —SO$_2$—, —N=N—, —CH$_2$—, —CH=CH—, —O—CH$_2$—O—

—CONH—, —NHCONH— or —CONHNH-CO—, Q is —O— or —NH— and Z is —O— or —S— and R and R' are independently of each other hydrogen, halogen, C$_1$-C$_4$-alkyl, C$_1$-C$_4$-alkoxy or phenoxy, and (b) a compound of the formula II

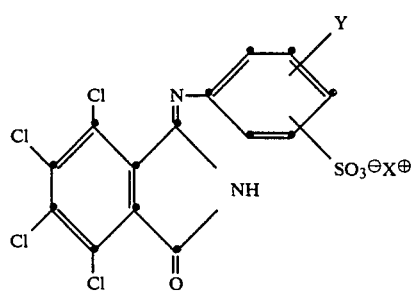

in which X$^\oplus$ is H$^\oplus$ or a group of the formulae $$\frac{M^{n\oplus}}{n}$$

or N$^\oplus$(R$_1$) (R$_2$) (R$_3$) (R$_4$), M$^{n\oplus}$ is an n-valent metal cation, n is 1, 2 or 3, R$_1$, R$_2$, R$_3$ and R$_4$ are independently of one another hydrogen, C$_1$-C$_{18}$-alkyl, C$_5$-C$_6$-cycloalkyl, unsubstituted or C$_1$-C$_{18}$-alkyl-substituted phenyl or R$_3$ and R$_4$ together with the N atom form a pyrrolidine, imidazolidine, piperidine, piperazine or morpholine radical, or R$_2$, R$_3$ and R$_4$ together with the N atom form a pyrrole, pyridine, picoline, pyrazine, quinoline or isoquinoline radical and Y is hydrogen, halogen, methyl or amino.

2. A composition according to claim 1, containing as component (a) a compound of the formula I in which A is a group of the formula

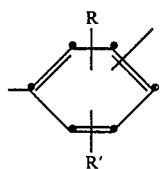

in which R and R' are independently of each other hydrogen, chlorine, methyl, methoxy or ethoxy.

3. A composition according to claim 1, containing as component (a) a compound of the formula I in which A is unsubstituted p-phenylenediamine.

4. A composition according to claim 1, containing as component (b) a compound of the formula II in which X$^\oplus$ is a group of the formula $$\frac{M^{n\oplus}}{n}$$

in which M$^{n\oplus}$ and n are as defined in claim 1.

5. A composition according to claim 1, containing as component (b) a compound of the formula II in which X$^\oplus$ is a group of the formula $$\frac{M^{n\oplus}}{n}$$

in which M$^{n\oplus}$ is an alkali metal or alkaline earth metal cation and n is 1 or 2.

6. A composition according to claim 5, wherein M$^{n\oplus}$ is a calcium cation.

7. A composition according to claim 1, wherein the mixing ratio of component (a): component (b) is 99 to 90% by weight: 1 to 10% by weight.

8. A composition according to claim 1, containing
(a) an isoindolinone pigment of the formula

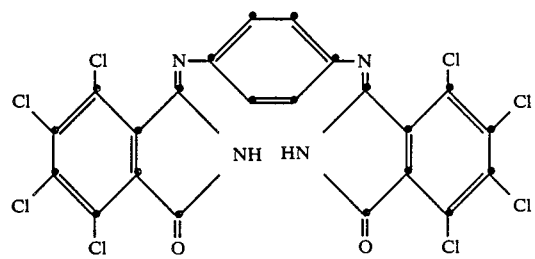

and
(b) 5% by weight, based on (a), of the compound of the formula

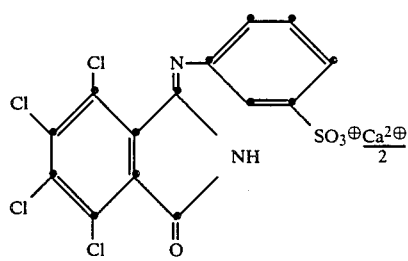

9. A composition according to claim 1, containing
(a) C.I. Pigment Yellow 110 and
(b) 5% by weight, based on (a), of the compound of the formula

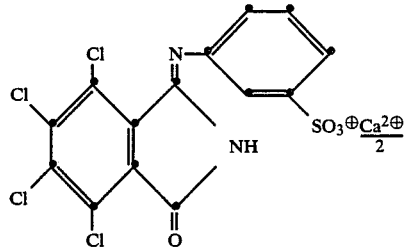

10. A composition according to claim 1, containing (a) C.I. Pigment Yellow 110 and (b) 5% by weight, based on (a), of the compound of the formula

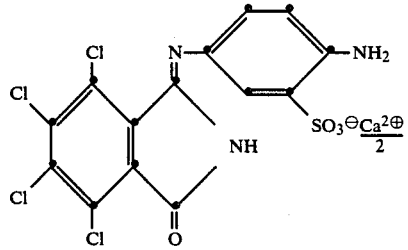

11. A high molecular weight organic material containing a composition according to claim 1.

12. A compound of the formula II

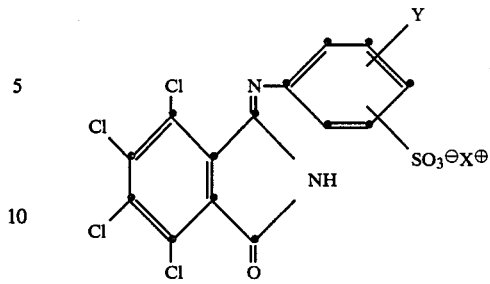

in which $X^\oplus$ is $H^\oplus$ or a group of the formulae $$\frac{M^{n\oplus}}{n}$$

or $N^\oplus(R_1)(R_2)(R_3)(R_4)$, $M^\oplus$ is an n-valent metal cation, n is 1, 2 or 3, $R_1$, $R_2$, $R_3$ and $R_4$ are independently of one another hydrogen, $C_1$–$C_{18}$-alkyl, $C_5$–$C_6$-cycloalkyl, unsubstituted or $C_1$–$C_{18}$-alkyl-substituted phenyl or $R_3$ and $R_4$ together with the N atom form a pyrrolidine, imidazolidine, piperidine, piperazine or morpholine radical, or $R_2$, $R_3$ and $R_4$ together with the N atom form a pyrrole, pyridine, picoline, pyrazine, quinoline or isoquinoline radical and Y is hydrogen, halogen, methyl or amino.

13. A compound of the formula II according to claim 12, wherein $X^\oplus$ is a group of the formula $$\frac{M^{n\oplus}}{n}$$

as defined in claim 12.

14. A compound of the formula II according to claim 12, wherein $X^\oplus$ is a group of the formula $$\frac{M^{n\oplus}}{n}$$

in which $M^{n\oplus}$ is an alkali metal or alkaline earth metal cation and n is 1 or 2.

15. A compound of the formula II according to claim 12, wherein $X^\oplus$ is a group of the formula $$\frac{M^{n\oplus}}{n}$$

in which $M^{n\oplus}$ is a calcium cation and n is 2.

* * * * *